United States Patent [19]

Hollingsworth

[11] 3,801,141

[45] Apr. 2, 1974

[54] PIPE CLAMP WITH CAPTIVE BRIDGING MEMBER

[75] Inventor: Albert A. Hollingsworth, Anniston, Ala.

[73] Assignee: The Mead Corporation, Woodward, Ala.

[22] Filed: Sept. 11, 1972

[21] Appl. No.: 287,624

[52] U.S. Cl.................................. 285/236, 285/373
[51] Int. Cl............................................... F16l 21/06
[58] Field of Search ........... 285/236, 365, 366, 367, 285/373, 407, 410, 411, 419

[56] References Cited
UNITED STATES PATENTS

| 2,778,085 | 1/1957 | Bernard | 285/419 X |
| 2,041,132 | 5/1936 | Johnson | 285/373 X |
| 3,402,946 | 9/1968 | Dedian | 285/236 |
| 3,700,008 | 10/1972 | Hackman | 285/373 X |

FOREIGN PATENTS OR APPLICATIONS

| 1,282,373 | 11/1968 | Germany | 285/373 |
| 861,400 | 2/1961 | Great Britain | 285/373 |

Primary Examiner—Henry S. Jaudon
Assistant Examiner—David H. Corbin
Attorney, Agent, or Firm—Jennings, Carter & Thompson

[57] ABSTRACT

A clamp for forcing an elastomeric gasket into sealing contact with the outer surfaces of two end to end conduits. The clamp itself is a unitary sleeve, split longitudinally and slit for a portion of its circumference to provide separately clampable portions which may be secure about the gasket, thus to seal and make fluid tight said conduits, even though the conduits may be of different diameters, out of round, or have different surface contours, as for example, as-cast cast iron pipe. My invention is characterized by the provision of a relatively thin sheet metal member which bridges over the longitudinal split in the sleeve and further is characterized by the provision of said bridging member which has arcuate, outturned flanges at each end which lie alongside the ends of the clamp, whereby the arcuate member is held captive at all times between the gasket and the inner surface of the clamp proper.

1 Claim, 4 Drawing Figures

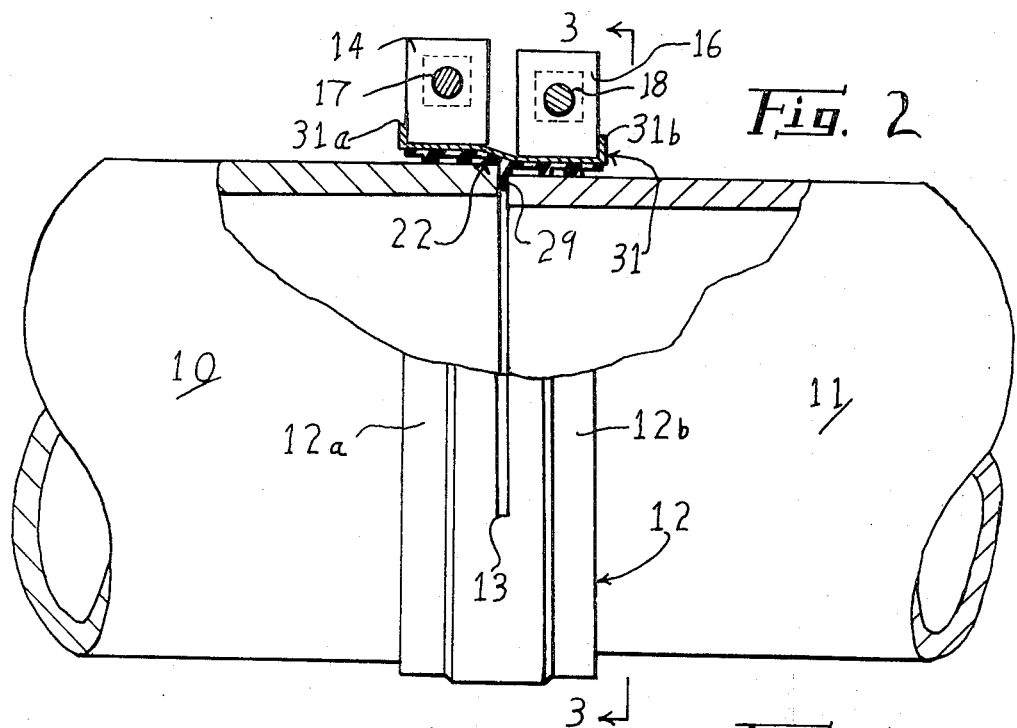
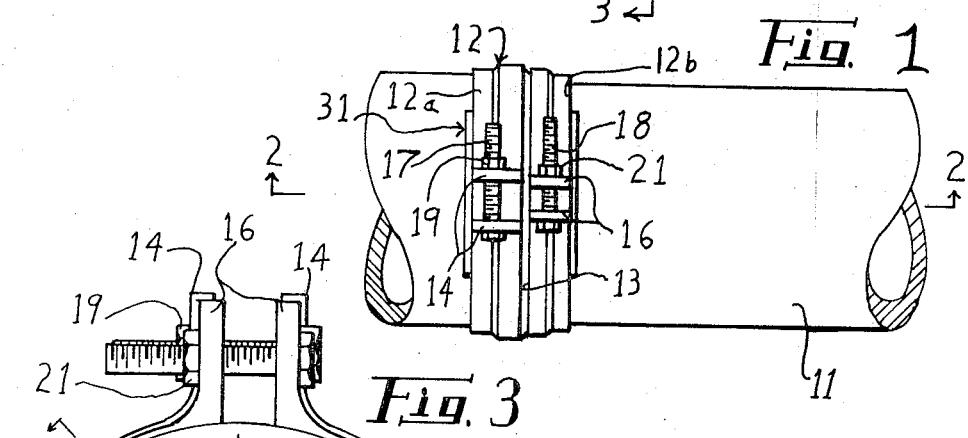
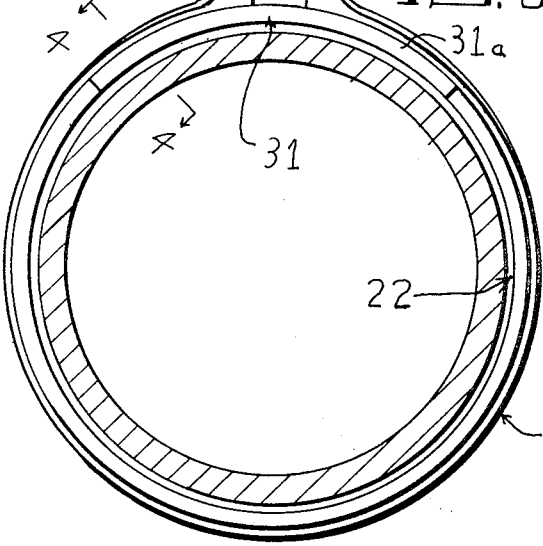
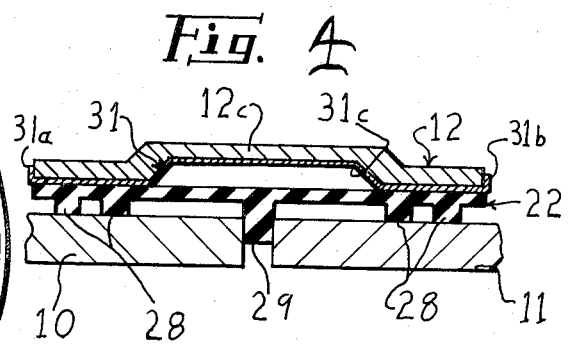

PIPE CLAMP WITH CAPTIVE BRIDGING MEMBER

My invention relates to clamps particularly adapted to connect a pair of end to end conduits in fluid tight manner and has for its object to provide such clamp comprising essentially a cylindrical sleeve split longitudinally and then slit for a substantial portion of its circumference, thus to provide separately clampable portions which may be individually drawn tight about the conduits, even though they are of different outside diameter, out of round, or have different or varying surface contours or finish.

My invention contemplates a clamp of the character designated which furtner includes a member for bridging the longitudinal split in the sleeve and which is further characterized as being an arcuate member of relatively thin material such as sheet steel and which has arcuate, outturned flanges on each end, which, when the bridging member is in place in the assembly, lie against the ends of the clamp, thus to hold the bridging member captive between the gasket and the sleeve.

My invention also contemplates the combination as aforestated in which the sleeve is provided on its inner circumference with a centrally disposed portion of increased diameter, and in which the arcuate member is provided with a centrally disposed arcuate portion likewise of increased diameter, thus to mate or fit into the increased inner diameter of the clamp, assuring that when bolts or the like are drawn up to tighten the respective portions of the clamp about the respective pipes, only the end portions of the gasket perfect the seal, leaving the central portion of the gasket relatively uncompressed, the bridging member, nevertheless, serving to bridge over the longitudinal split in the sleeve.

A clamp illustrating features of my invention is shown in the accompanying drawings in which:

FIG. 1 is a plan view showing my improved clamp applied to a pair of conduits, the righthand one of which in FIG. 1 is smaller in outside diameter than the lefthand one;

FIG. 2 is an enlarged detail sectional view taken generally along line 2—2 of FIG. 1;

FIG. 3 is a detail sectional view taken generally along line 3—3 of FIG. 2; and, FIG. 4 is an enlarged detail fragmental sectional view taken generally along line 4—4 of FIG. 3.

Referring now to the drawings for a better understanding of my invention I show the same employed to join in fluid tight manner the ends of a pair of end to end conduits or pipes 10 and 11. While my invention is suitable for joining pipes or conduits made of various material, it is particularly useful for joining as-cast, cast iron pipe. As is known, such cast iron pipe is manufactured within tolerances which admit of considerable variations in diameter, roundness and surface configuration or condition.

My improved clamp comprises generally a sleeve type body indicated generally by the numeral 12. The sleeve is split longitudinally as shown. Furthermore, the sleeve is slit through the split ends for a substantial portion of the circumference of the clamp as indicated at 13, the slit starting at the free ends resulting from the longitudinal splitting of the clamp.

Due to the provision of the splits 13 it will be seen that I provide, in effect, separately clampable bands 12a and 12b. Adjacent the free ends of the respective bands 12a and 12b I provide radial, outwardly extending pairs of lugs 14 and 16 and these are provided with openings to receive threaded bolts 17 and 18 which receive nuts 19 and 21.

The structure so far described, essentially, is old in the art. Likewise old in the art is the provision of a sealing gasket for use with the clamp and which is indicated in the drawings generally by the numeral 22. Thus, the gasket 22 may be provided adjacent its ends with sealing ribs 28 which contact the respective pipes or conduits 10 and 11, when the clamp is drawn up. Also, the gasket may be provided with a centrally disposed rib 29 adapted to enter between the ends of the conduits to keep them from contacting.

It will further be noted that the sleeve 12 is provided with an enlarged diameter section 12c adjacent the center part of the sleeve. It will thus be apparent that when the respective portions 12a and 12b are drawn up as will be explained the central part of the gasket is relatively uncompressed.

My invention comprises the provision of the specifically shaped and contoured bridging member indicated generally by the numeral 31. This member may be made of relatively thin sheet material such as thin stainless steel and may be arcuate in shape as illustrated particularly in FIG. 3. Furthermore, the member 31 is provided with arcuate flanges 31a and 31b which bear against the ends of the clamp 12. Still further, the bridging member 31 may be provided with a centrally disposed section 31c which is adapted to fit in the enlarged diameter section 12c of the clamp. As shown, when the arcuate member 31 is in place it is held captive between the gasket 22 and the inner surface of the clamp 12.

From the foregoing it will be seen that I have devised an improved clamp with captive bridging member. The bridging member 31 assures that the gasket is made properly to seal across the split of the clamp itself, but otherwise in no way interfers with the operation of the clamp. Furthermore, and as clearly illustrated in FIG. 2, in the event one of the conduits is smaller than the other the drawing down of the nuts 19 and 21 on their respective bolts causes the bridging member to become reduced in diameter in that area thereof under the section 12a or 12b of the clamp which fits about the smaller of the conduits. Thus, while fully captive between the gasket and the sleeve of the clamp, the member 31 does not in any way interfere with the installation or sealing of the clamp. It will be understood that the conduits are inserted into the clamp with the gasket and bridging member in place, bringing the ends of the conduits into contact with the respective sides of the central rib 29. The nuts 19 and 21 are then drawn up on their respective bolts, tightly clamping the gasket about the ends of the conduits and making the seal.

While I have shown my invention in but one form, it will be obvious to those skilled in the art that it is not so limited, but is susceptible of various other changes and modifications without departing from the spirit thereof.

What I claim is:

1. In a clamp for securing a cylindrical, elastomeric gasket fluid tight about the ends of two generally cylindrical conduits placed substantially end to end, a. a unitary generally cylindrical sleeve of an inner diameter to fit about the outer circumference of the gasket and of a length to clamp the gasket about the ends of the conduits, said sleeve being split longitudinally to provide adjacent free ends thereof, b. said sleeve being circumferentially slit through the free ends and for a substantial distance from the free ends around the circumference thereof, thus to divide the sleeve longitudinally into two arcuate, separately clampable portions, c. an arcuate member of sheet metal interposed between the gasket and the sleeve in the area of the longitudinal split in said sleeve and of a length to bridge over said split, d. said arcuate member having outturned arcuate flanges along the sides thereof lying alongside the ends of said sleeve, thereby to hold the arcuate member captive between the sleeve and gasket prior to assemblying the sleeve and gasket about the conduits, e. the longitudinal central portion of the clamp being of larger diameter than the end portions thereof, f. said arcuate member having a centrally disposed, arcuate portion of enlarged diameter disposed to fit in said larger diameter portion of said clamp, whereby when the clamp is drawn up about the gasket which surrounds the conduits to be coupled the clamping forces are exerted on the gasket adjacent the longitudinal ends thereof, said increased diameter portion of said arcuate member affording room for the material of the gasket to flow into said enlarged diameter section, and g. means associated with said clamping portions of the sleeve for drawing them about the gasket, whereby conduits having different outside diameters may be coupled fluid tight in said end to end relationship and with said arcuate member bridging the gap between the free ends of the sleeve.

* * * * *